United States Patent [19]
Pannier et al.

[11] Patent Number: 6,024,876
[45] Date of Patent: Feb. 15, 2000

[54] REACTOR FOR BIOLOGICALLY REMOVING ORGANIC POLLUTANTS FROM WATER

[75] Inventors: Michèle Pannier, Croissy-sur-Seine; Alain Truc, Levallois-Perret; Patrick Vion, Houilles, all of France

[73] Assignee: Degremont, Rueil Malmaison, France

[21] Appl. No.: 09/125,170

[22] PCT Filed: Feb. 10, 1997

[86] PCT No.: PCT/FR97/00260

§ 371 Date: Aug. 11, 1998

§ 102(e) Date: Aug. 11, 1998

[87] PCT Pub. No.: WO97/29998

PCT Pub. Date: Aug. 21, 1997

[30] Foreign Application Priority Data

Feb. 16, 1996 [FR] France ................................. 96 01963

[51] Int. Cl.[7] ................................. C02F 3/12; C02F 3/30
[52] U.S. Cl. .................... 210/616; 210/150; 210/205; 210/903
[58] Field of Search .................... 210/603, 615–619, 210/620–622, 150, 151, 205, 903

[56] References Cited

U.S. PATENT DOCUMENTS

| | | | |
|---|---|---|---|
| 4,725,397 | 2/1988 | Downing et al. | 210/617 |
| 5,078,884 | 1/1992 | Mulder | 210/903 |
| 5,259,959 | 11/1993 | Mulder | 210/903 |
| 5,458,779 | 10/1995 | Odegaard | 210/616 |
| 5,480,551 | 1/1996 | Chudoba et al. | 210/616 |
| 5,543,039 | 8/1996 | Odegaard | 210/150 |

FOREIGN PATENT DOCUMENTS

| | | |
|---|---|---|
| 0010571 | 5/1980 | European Pat. Off. . |
| 0154334 | 9/1985 | European Pat. Off. . |
| WO9325485 | 12/1993 | WIPO . |

OTHER PUBLICATIONS

Patent Abstracts of Japan, vol. 009, No. 271 (C–311), Oct., 1985.

*Primary Examiner*—Thomas G. Wyse
*Attorney, Agent, or Firm*—Pollock, Vande Sande & Amernick

[57] ABSTRACT

A mixed culture reactor biologically removes organic pollution and nitrates by the anoxic route. The reactor includes a central stirred section having a lower part in which biological treatment of supplied raw water takes place. The central reactor section contains a suspension of an attached biomass of low concentration, in the order of a few grams per liter. At least one propelling screw is positioned within a jacket that is coaxially located in the reactor central section to ensure the circulation of the water to be treated. The water to be treated circulates in one direction within the jacket and in an opposite direction outside the jacket. The speed of circulation is selected so that bioparticles remain in suspension within the reactor central section. A release zone is located externally of the reactor central section and communicates with a lower part thereof. The water treated within the reactor central section escapes through the release zone, to the upper part of the central section, in accordance with an ascending current. This current has a speed such that the decantation speed of the bioparticles is greater than the speed of the water, and the speed of decantation of the excess biomass produced by biological reactions (denitrification in particular) is less than the speed of the water. Means are also included for enlarging a reactive zone at the lower part of the release zone.

28 Claims, 6 Drawing Sheets

REACTOR FOR BIOLOGICALLY REMOVING ORGANIC POLLUTANTS FROM WATER

The present invention relates to a reactor of the mixed-cultures type which is intended for the biological removal of organic pollution from water, as well as for the biological removal of nitrates by the anoxic route.

Before explaining the invention, it is appropriate to restate a certain number of definitions and, in particular, those of the term "mixed cultures" in relation to activated sludges and to fixed cultures:

activated sludges: the biomass is free, in suspension in an aerated or unaerated tank;

fixed cultures: the biomass is fixed on a solid support, and the general appearance of the equipment is most frequently comparable to a filter;

mixed cultures: the biomass is attached to support particles, thus forming what will be referred to hereinbelow as bioparticles, which are maintained in suspension in the water flow to be treated.

Moreover, the fixed cultures provide a function of "selection and enrichment of the biomass in bacteria which are specific to the treatment conditions, in particular the denitrifying heterotrophic bacteria in the case of biological denitration reactors", a feature which is advantageously utilized in the case of mixed cultures.

Devices are known which permit the implementation of biological treatments of effluents. Among these devices, there are some which utilize induced circulations of the effluents by "air lift" or "gas lift". By way of example of this prior art, it is possible to cite in particular WO-A 93 25485, JP-A 60-122095 and EP-0010571. Such systems cannot be utilized to carry out a denitrification, that is to say treatments by the anoxic or anaerobic routes. It is, moreover, impossible to utilize them where it is desired to carry out treatments with the aid of mixed cultures, given that the "air lift" or "gas lift" circulation systems have the major disadvantage of releasing the cultures from the supports on which they are fixed.

Devices are, moreover, already known which permit the performance of a denitrification of effluents with the aid of bacteria which reduce nitric nitrogen to a lower state of oxidation. These known devices are, in particular, the following:

biological reactors containing activated sludges;

reactors containing fixed cultures, grain beds and trickle beds.

These known devices have the disadvantage:

in the case of reactors containing activated sludges, of being bulky;

in the case of reactors containing fixed cultures, of requiring supplementary equipment, in particular to ensure the maintenance of the hydraulic conditions (elutriations, disagglomerations, etc.), and of consuming energy.

The object of the invention is to create a reactor which is more compact than those of the systems incorporating activated sludges, which is more economical both in terms of equipment costs and in terms of operating costs and which permits the biological removal of pollution, in particular nitrogenous pollution, to be ensured under the best conditions.

To this end, the subject of the present invention is a reactor of the mixed-cultures type which is intended for the biological removal of organic pollution from water, as well as for the biological removal of nitrates by the anoxic route, characterized in that it comprises:

an agitated central reactor, supplied with untreated water in its lower part and within which the biological treatment takes place, which reactor contains a suspension of a fixed biomass, of low concentration of the order of a few grams per liter, said agitated reactor including at least one propelling screw positioned within an internal jacket and coaxial with said reactor, to ensure the circulation of the water to be treated, the latter circulating in accordance with an ascending or descending current within said jacket and in the opposite direction, descending or ascending, outside the latter and at a speed which is selected so that the bioparticles remain in suspension within said agitated reactor, a release zone external to said agitated central reactor and preferably communicating with the lower part of the latter, the water treated within this agitated reactor escaping through said release zone, to the upper part of the latter, in accordance with an ascending current at a speed such that, on the one hand, the speed of decantation of the bioparticles is greater than the speed of the water and, on the other hand, the speed of decantation of the excess biomass produced by the biological reactions, in particular of denitrification, is less than the speed of the water, and means for enlarging the reactive zone at the lower part of the release zone.

According to an embodiment of the invention, the water to be treated is introduced into the jacket, for example at the lower part of the latter, and the current of the water circulating within this jacket is implemented in the ascending direction and then in the descending direction outside the latter.

According to another embodiment of the invention, the water to be treated is introduced between the jacket and the internal wall of said reactor, the circulation thereof taking place in the ascending direction outside said jacket and in the descending direction within the latter.

According to the invention, the active biomass contained within said reactor is essentially fixed on particles, preferably mineral particles, of small particle size, that is to say within the range between 50 and 500 microns, preferably 100 to 300 microns.

According to the present invention, the concentration of the bioparticles in suspension within said agitated reactor is of the order of 5 to 100 grams of bioparticles per liter (support material+fixed biomass) and preferably 10 to 40 grams per liter.

According to the invention, the support of the biomass may be constituted by an organic or mineral material of density greater than 1, preferably of the family of silicoaluminates, in particular a kaolin clay, or by fine sand.

According to the invention, the means provided for enlarging the reactive zone at the lower part of the release zone comprise deflectors enlarging the zone of contact between the water to be treated and the bioparticles and ensuring maintenance of the bioparticles within this zone.

According to a variant of the device of the invention, means are provided for injecting air into the circulation of the water, preferably between said jacket and the internal wall of the reactor.

Other features and advantages of the present invention will become evident from the description which is given hereinbelow with reference to the accompanying drawings, which illustrate embodiments thereof which have no limiting character whatsoever.

Figure 1:
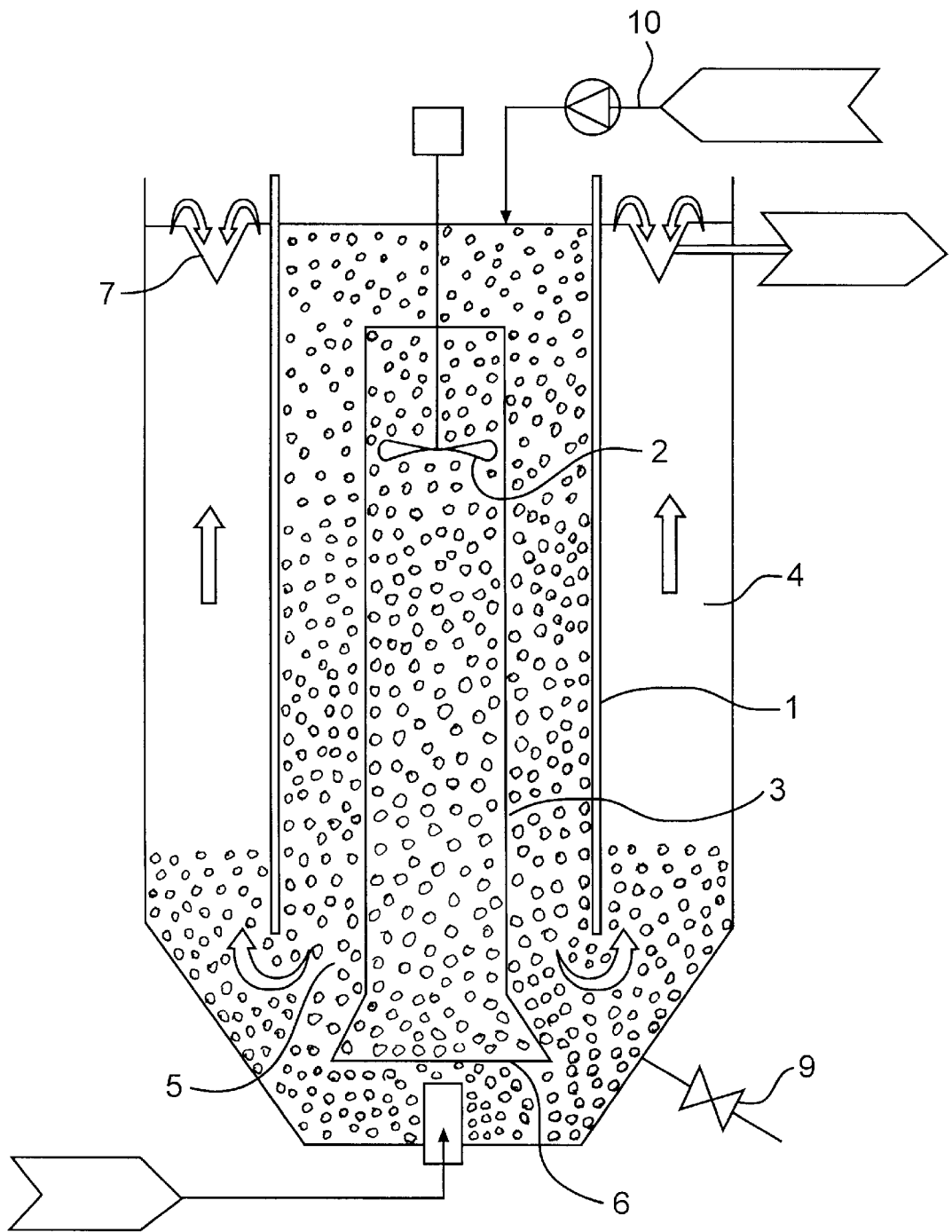
FIG. 1 is a diagrammatic view, in vertical axial cross-section, of the general embodiment of a reactor according to the invention.
Figure 2:
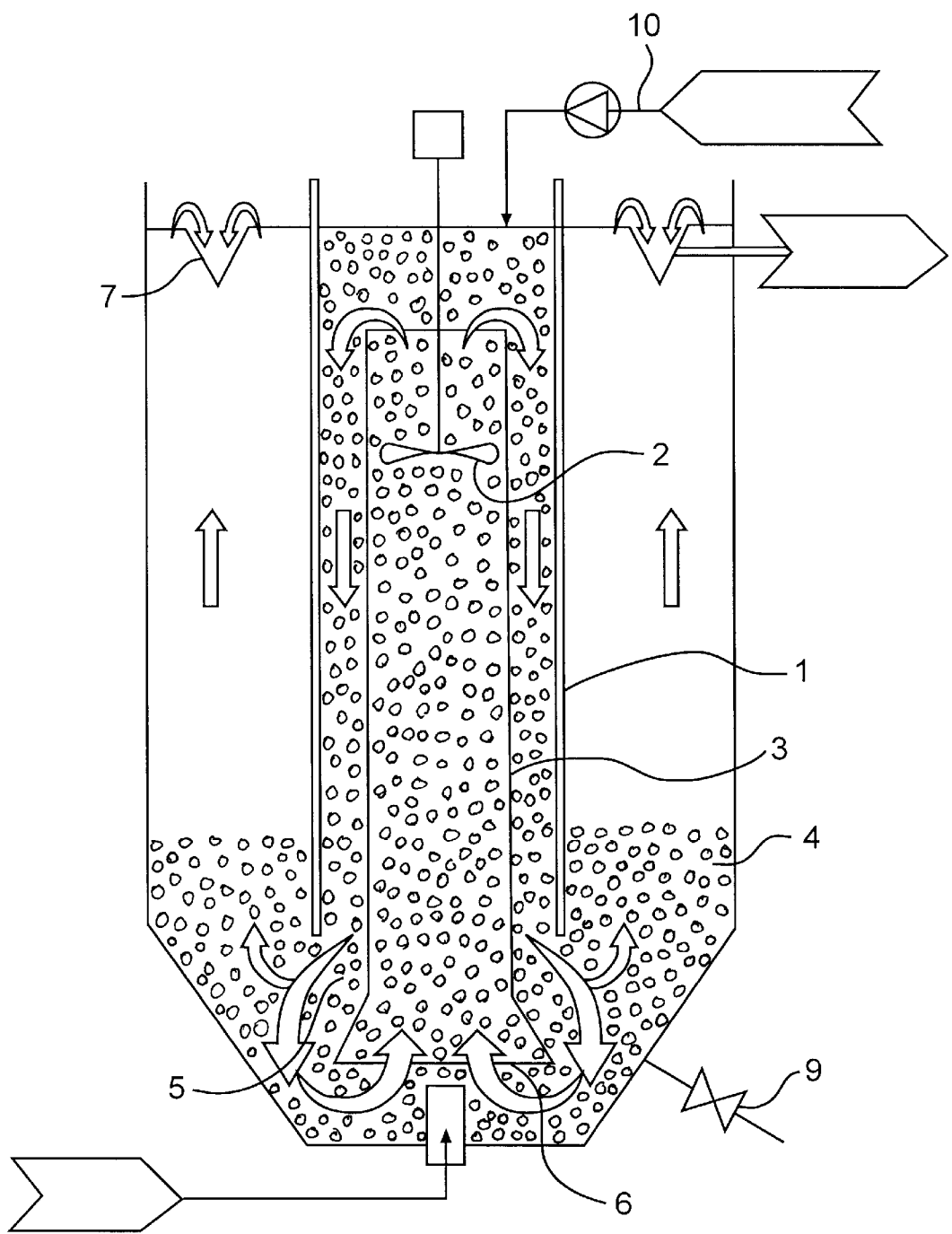
FIG. 2 is a view, similar to FIG. 1, of a preferred embodiment of the reactor of the invention.
Figure 3:
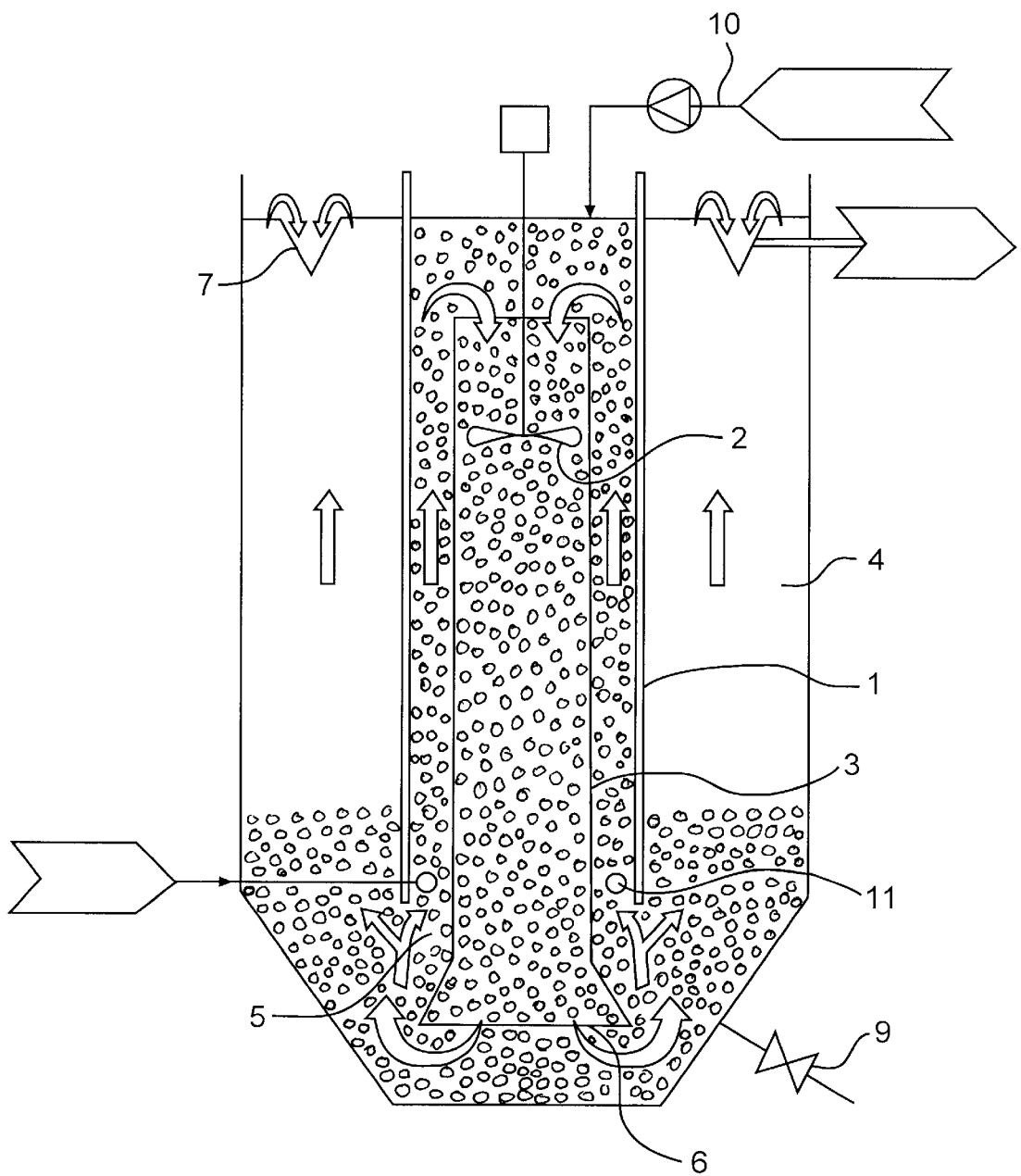
FIG. 3 is a view, similar to FIGS. 1 and 2, illustrating a variant of the reactor according to the invention.

Referring to the figures, and in particular to FIGS. 1 to 3, it is seen that, in these embodiments, the reactor according to the present invention includes two parts:

an agitated central reactor 1 in which there is positioned a jacket 3 receiving a propelling screw 2 at its upper part, this propelling screw being driven by any appropriate motor. The water to be treated circulates according to an ascending or descending current within said jacket and in the opposite direction, descending or ascending, outside this jacket. There is possibly added to the water a carbon-containing substrate, for example methanol, ethanol, etc. . . . ;

a release zone 4, external to the central reactor 1, communicating with the latter through its lower part 5, the water treated within this reactor escaping through this release zone, to the upper part of the latter.

In the embodiment illustrated in FIG. 2, the untreated water to be treated is introduced into the jacket 3, preferably at its lower part 6. The water circulates within the jacket in accordance with an ascending movement, and in accordance with a descending movement outside the jacket. The water originating from the agitated reactor 1 escapes through the release zone 4 in accordance with an ascending current in order to be collected in troughs such as 7 which are disposed at the upper part of the reactor according to the invention.

Figure 5:
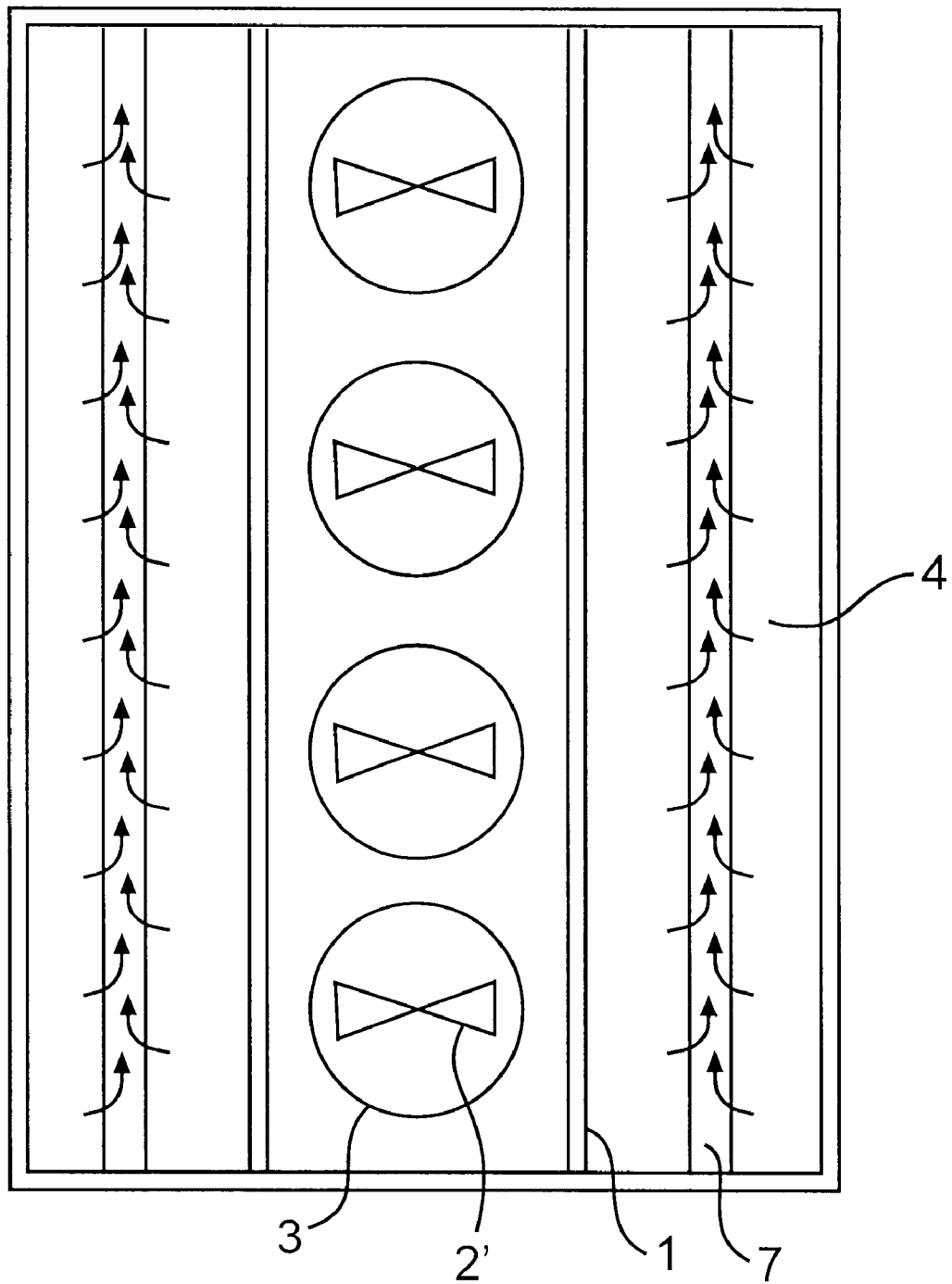
FIG. 5 is a plan view illustrating a variant of a reactor according to the invention, which is constructed in the form of a parallelepipedic enclosure including a plurality of propelling screws positioned within the central part of the reactor.

In the embodiment illustrated in FIGS. 1 and 2, the reactor is of cylindrical shape with a vertical axis and the agitated reactor 1 is coaxial with the reactor proper. It is of course possible, without departing from the scope of the invention, to contemplate any other shape. Thus, the reactor may be provided in the form of an elongate parallelepipedic channel or enclosure including at its centre the agitated reactor, equipped with one or more jacketed propelling screws, likewise provided in the form of a parallelepipedic enclosure disposed along its longitudinal axis. In this variant illustrated in FIG. 5, FIG. 1 of the accompanying drawing constitutes a cross-section of such a reactor. It is seen that, in this case, there are provided a plurality of jacketed propelling screws such as 2'.

The device further includes a draining system 9 intended to ensure the reduction in concentration or adjustment of concentration, in a contingent or systematic fashion, of the bioparticles contained within the reactor 1, as well as the emptying of this reactor and the removal of the heavy particles. There is likewise provided a means 10 for recharging with support material (clay or other).

The reactor according to the invention contains an active biomass, of low concentration, that is to say of the order of 5 to 100 grams per liter, and preferably 10 to 40 grams per liter, which is fixed on mineral particles of small particle size, that is to say of the order of 50 to 500 microns and preferably 100 to 300 microns. The material utilized as support for the biomass may advantageously be a mineral of the family of silicoaluminates (for example a kaolin clay) or a fine sand.

The jacketed propelling screw 2 maintains in movement the water which is contained within the agitated reactor: in the embodiment illustrated in FIG. 2, its direction of rotation is such that it causes this water to circulate in accordance with an ascending movement within the jacket 3 and in accordance with a descending movement outside this jacket, between the latter and the wall of the agitated reactor 1. In the variant represented in FIG. 3, its direction of rotation is such that the water circulates in accordance with an ascending movement outside the jacket and a descending movement within the latter. In this variant, the supply of water to be treated is effected via a toric system diagrammatically represented at 11. The speeds of the water are such that the bioparticles remain in suspension within the agitated reactor 1 and it is within this reactor that the biological removal of pollution, for example biological denitrification, takes place.

The jacketed propelling screw also has the function of supplying agitation energy, the effect of which is to limit, by shearing, the quantity of biomass fixed on the bioparticles.

At its exit from the agitated reactor 1, the water escapes through the lower part 5 of this reactor to the release zone 4, in which it is driven in accordance with an ascending current. In FIGS. 2 and 3, the arrows clearly indicate the directions of circulation of the water from its introduction at the base 6 of the agitated reactor 1 to its evacuation, after treatment, into troughs 7 disposed at the upper part of the release zone 4. In this release zone, the speed of the water is such that:

the bioparticles are not entrained by the treated water: the speed of decantation of the bioparticles is greater than the speed of the water, and the excess biomass, that is to say the biomass particles produced by the biological reactions and which are torn away by the shearing effect of the propelling screw 2 as has been indicated above, are entrained by the treated water: the speed of decantation of these excess biomass particles is less than the speed of the water.

Thus, and according to the invention, the mutual suitability of the reactor and of the bioparticles (density and particle size) and the speeds of the water make it possible for the bioparticles to be maintained in suspension within the agitated zone 1 and for them not to be entrained within the release zone 4, while maintaining a stable biomass by virtue of the removal of the excess biomass by the shearing effect of the propelling screw 2.

Figure 4:
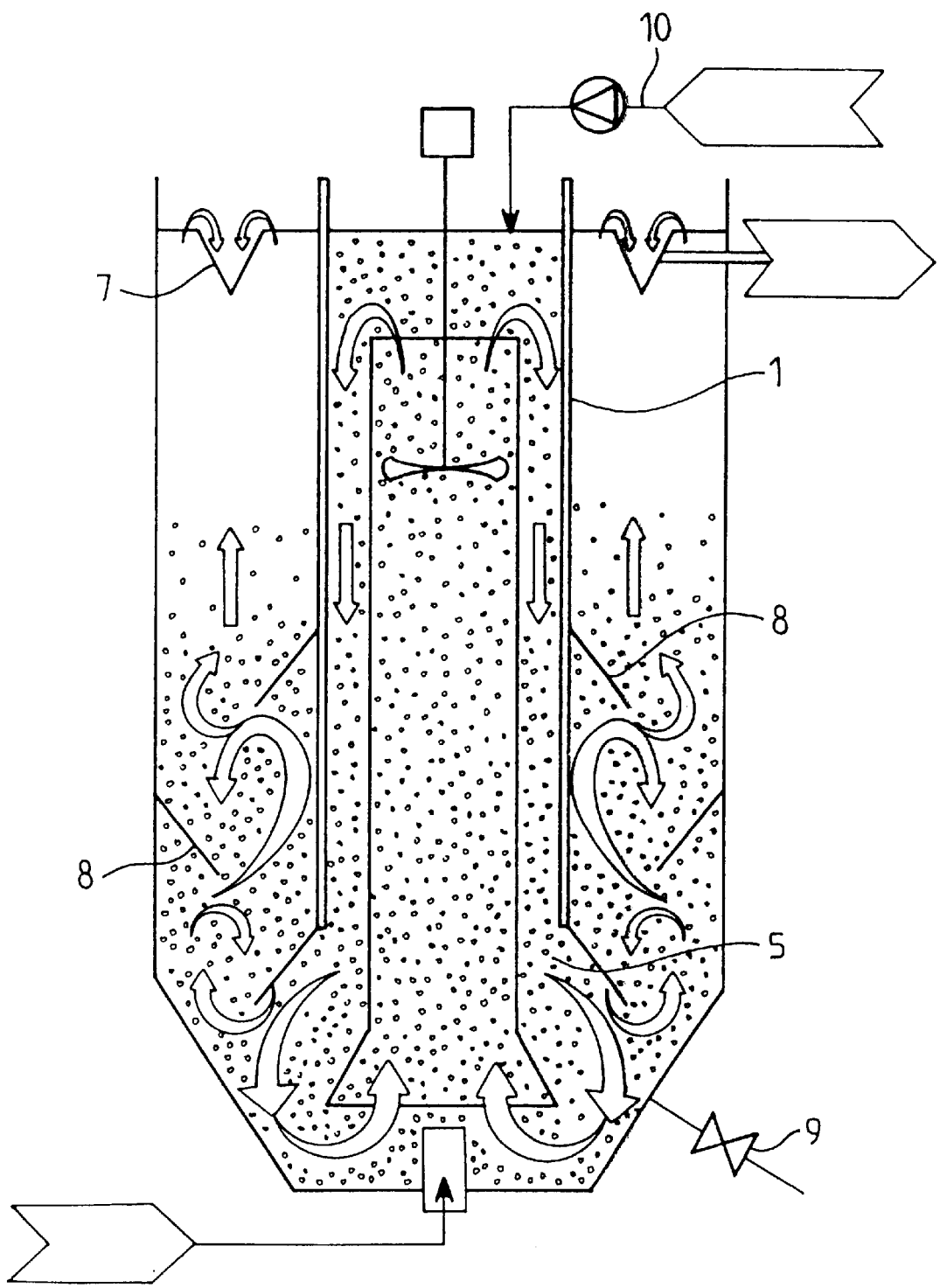
FIG. 4 is a view, similar to FIGS. 1 to 3, illustrating a variant of the reactor according to the invention incorporating systems of the deflectors type.

In FIG. 4, the reactor according to FIGS. 1 to 3 has been represented with its means permitting the enlargement of the reactive zone at the lower part 5 of the release zone 4. In the nonlimiting embodiment illustrated in this FIG. 4, there are provided within this reactive zone means of the deflectors type which are represented diagrammatically at 8. Of course, it is possible to utilize any other equivalent means.

Figure 6:
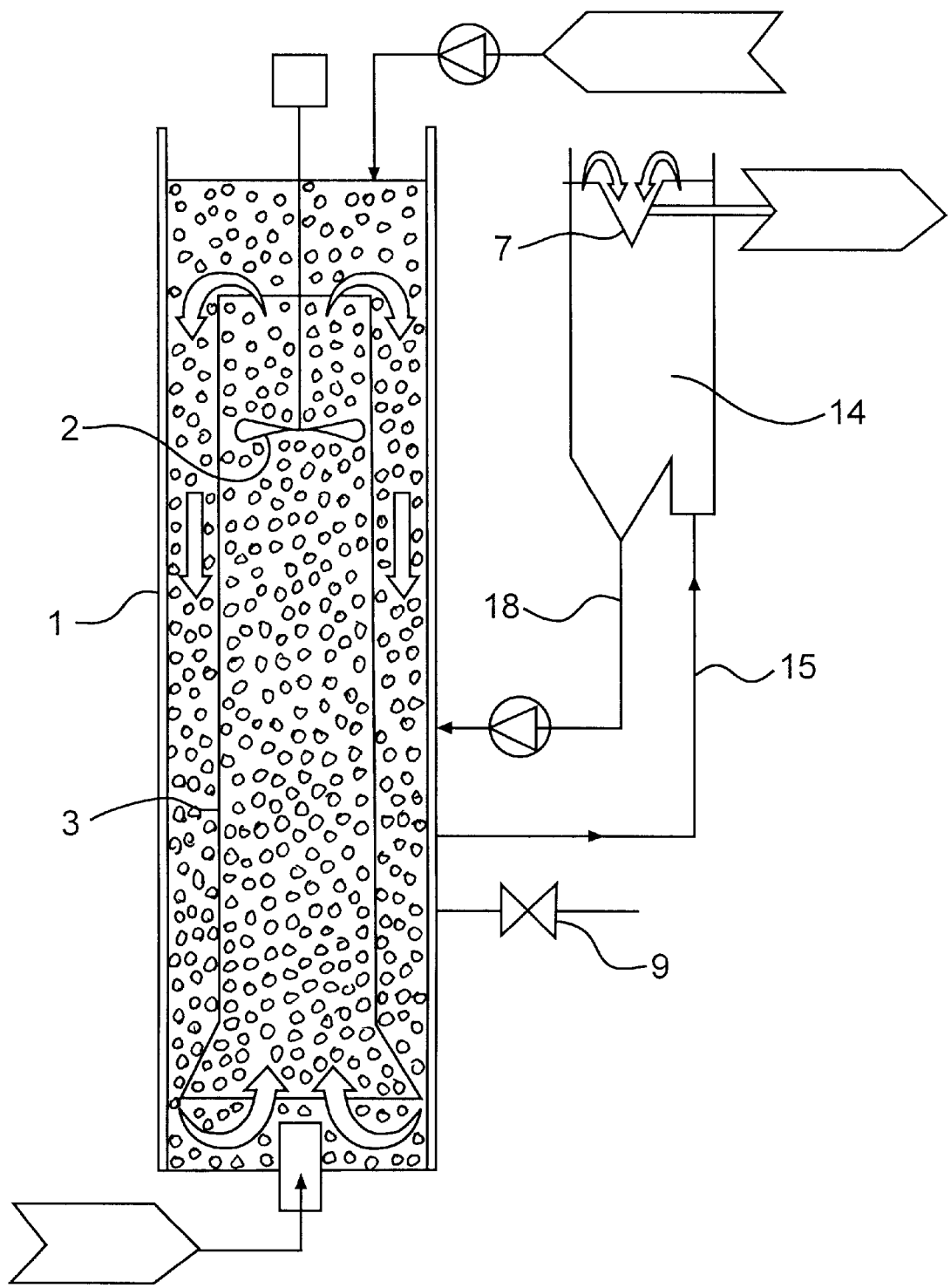
FIG. 6 illustrates yet another variant of the reactor according to the invention.

FIG. 6 illustrates another variant of the reactor according to the invention.

In FIG. 6, it is seen that in this case the release zone 14 is separated from the agitated reactor and it communicates with the latter via a duct 15. In this variant, the particles entrained within the external release zone 14 are carried back into the reactor via a duct 18.

The reactor according to the present invention may be applied, in particular, in the denitrification of urban waste water, that is to say:

in a pre-denitrification: mixture of untreated water and recirculated nitrified water (the carbon required is found in the carbon-containing pollution of the untreated water);

in a post-denitrification: nitrified water to which there is added a carbon-containing substrate (methanol, ethanol, etc.).

It is likewise possible to utilize the reactor according to the invention in the denitrification of drinking water and likewise for the purpose of carrying out any anoxic, anaerobic or aerobic biological reaction.

Among the advantages achieved by the present invention as compared with the existing techniques recalled hereinabove, it is possible to cite in particular the following:

that as compared with conventional devices involving activated sludges, the invention permits the accomplishment of an increase in the applied loads in terms of volume; this is reflected in a compactness of the operations, achieving a large number of advantages including the following: facilitated insertion, more convenient covering operations, removal of odours, etc.

in comparison with the conventional solutions involving fixed cultures of the biofilter type, the invention achieves a reduction in equipment costs, both as regards capital investments and as regards operating costs;

by virtue of a low concentration of bioparticles, the invention achieves the following advantages as compared with reactors incorporating fixed cultures of the fluidized-bed type:

reduction in equipment costs and reduction in energy consumption levels;

control of stop/start sequences (small deposit volumes, ease of recreation of suspension) and limited abrasion (low concentration of small-size particles, the abrasiveness of which is moreover reduced by the biological encapsulation).

It does, of course, continue to be the case that the present invention is not restricted to the embodiments described and/or represented, but that it embraces all variants thereof, within the extent of the scope of the appended claims.

We claim:

1. A mixed culture reactor for biologically removing organic pollution and nitrates by the anoxic route and comprising:

a central stirred section having a lower part in which biological treatment of supplied raw water takes place;

the central reactor section containing a suspension of an attached biomass of low concentration, in the order of a few grams per liter;

at least one propelling screw positioned within a jacket that is coaxially located in the reactor central section to ensure the circulation of the water to be treated;

the water to be treated circulating in one direction within the jacket and in an opposite direction outside the jacket;

the speed of circulation selected so that bioparticles remain in suspension within the reactor central section;

a release zone located externally of the reactor central section and communicating with a lower part thereof;

the water treated within the reactor central section escaping through the release zone, to the upper part of the central section, in accordance with an ascending current, whereby the current has a speed such that the decantation speed of the bioparticles is greater than the speed of the water, and the speed of decantation of the excess biomass produced by biological reactions is less than the speed of the water; and means for enlarging a reactive zone at the lower part of the release zone.

2. Reactor according to claim 1, wherein the water to be treated circulates in accordance with an ascending current within said jacket and in accordance with a descending current outside the jacket.

3. Reactor according to claim 1, wherein the water to be treated circulates in accordance with a descending current within said jacket and in accordance with an ascending current outside the jacket.

4. Reactor according to claim 1, wherein the water to be treated is introduced into the lower part of the jacket and it circulates in accordance with an ascending current within said jacket and in accordance with a descending current outside the jacket.

5. Reactor according to claim 1, wherein the water to be treated is introduced between said jacket and the internal walls of said central reactor section, and it circulates in accordance with an ascending current outside said jacket and in accordance with a descending current within the jacket.

6. Reactor according to claim 1, which is cylindrically shaped with a vertical axis, said central reactor section and the jacket receiving the propelling screw being likewise cylindrical and coaxial.

7. Reactor according to claim 1, wherein the biomass which it contains is fixed on particles of density greater than 1 of small particle size, of the order of 50 to 500 microns.

8. Reactor according to claim 1, wherein the concentration of the bioparticles in suspension within the central reactor section is of the order of 5 to 100 grams per liter.

9. Reactor according to claim 7, wherein support of the biomass is constituted by an organic material.

10. Reactor according to claim 7, wherein support of the biomass is constituted by mineral material.

11. Reactor according to claim 10, wherein support of the biomass is constituted by a silicoaluminate.

12. Reactor according to claim 10, wherein support of the biomass is constituted by fine sand.

13. Reactor according to claim 1, including deflectors positioned in the release zone.

14. Reactor according to claim 1, wherein the release zone is separated from the central reactor section, and it communicates with the central reactor section via a duct.

15. A method for biologically removing organic pollution and nitrates by the anoxic route using a mixed culture reactor and comprising the steps:

providing a central stirred section having a lower part in which biological treatment of supplied raw water takes place;

providing the central reactor section with a suspension of an attached biomass of low concentration, in the order of a few grams per liter;

positioning at least one propelling screw within a jacket that is coaxially located in the reactor central section to ensure the circulation of the water to be treated;

circulating the water to be treated in one direction within the jacket and in an opposite direction outside the jacket;

selecting the speed of circulation so that bioparticles remain in suspension within the reactor central section;

locating a release zone externally of the reactor central section and communicating with a lower part thereof;

directing the water treated within the reactor central section through the release zone, to the upper part of the central section, in accordance with an ascending current, whereby the current has a speed such that the decantation speed of the bioparticles is greater than the speed of the water, and the speed of decantation of the excess biomass produced by biological reactions is less than the speed of the water; and enlarging a reactive zone at the lower part of the release zone.

16. The method according to claim 15, wherein the water to be treated circulates in accordance with an ascending current within said jacket and in accordance with a descending current outside the jacket.

17. The method according to claim 15, wherein the water to be treated circulates in accordance with a descending current within said jacket and in accordance with an ascending current outside the jacket.

18. The method according to claim 15, wherein the water to be treated is introduced into the lower part of the jacket and it circulates in accordance with an ascending current within said jacket and in accordance with a descending current outside the jacket.

19. The method according to claim 15, wherein the water to be treated is introduced between said jacket and the internal walls of said central reactor section, and it circulates in accordance with an ascending current outside said jacket and in accordance with a descending current within the jacket.

20. The method according to claim 15, wherein the reactor is cylindrically shaped with a vertical axis, said central reactor section and the jacket receiving the propelling screw being likewise cylindrical and coaxial.

21. The method according to claim 15, wherein the biomass which the reactor contains is fixed on particles of density greater than 1 of small particle size, of the order of 50 to 500 microns.

22. The method according to claim 15, wherein the concentration of the bioparticles in suspension within the central reactor section is of the order of 5 to 100 grams per liter.

23. The method according to claim 21, wherein support of the biomass is constituted by an organic material.

24. The method according to claim 21, wherein support of the biomass is constituted by mineral material.

25. The method according to claim 23, wherein support of the biomass is constituted by a silicoaluminate.

26. The method according to claim 23, wherein support of the biomass is constituted by fine sand.

27. The method according to claim 15, including deflectors positioned in the release zone.

28. The method according to claim 15, wherein the release zone is separated from the central reactor section, and it communicates with the central reactor section via a duct.

* * * * *